UNITED STATES PATENT OFFICE.

FRANK PREVOST, OF OAKLAND, CALIFORNIA, ASSIGNOR OF ONE-HALF TO CON DRISCOLL, OF OAKLAND, CALIFORNIA.

PROCESS OF MAKING A FOOD PRODUCT.

1,076,227. Specification of Letters Patent. Patented Oct. 21, 1913.

No Drawing. Application filed September 30, 1912. Serial No. 723,154.

*To all whom it may concern:*

Be it known that I, FRANK PREVOST, a citizen of the United States of America, residing at Oakland, in the county of Alameda and State of California, have invented certain new and useful Improvements in Process of Making a Food Product, of which the following is a specification.

This invention relates to a food product and the process of making the same. Patent 1,028,005 issued on May 28, 1912, under which I am the assignee of a one-half interest, discloses the combining of complete fresh eggs, sugar and cream and by "complete" I mean both the white and the yolk of the egg.

In my co-pending application, Serial Number 738,641, filed on the 26th day of December, 1912 I claim the preparation in powdered form of the yolks of the egg separate from the whites, together with the proper amount of sugar, but with the cream omitted. In many cases it is desired to use the white and yolk separately and by preparing them separately they may be used separately or may be combined after being reduced to powdered form.

The present invention contemplates the preparation in powdered form of the white of the egg after said white is separated from the yolk, said whites having the proper amount of sugar added thereto, and the resultant composition is then beaten from time to time and permitted to become dry after which it is reduced to powdered form and is ready for the market. While the proportion of sugar may be somewhat varied, I have found that approximately five-eighths as much sugar by weight as of egg produces a very desirable product. For instance to twenty-four ounces of the whites of eggs is added twelve ounces of sugar. In this respect the product radically differs from that set forth in the above named patent, where approximately twice as much sugar as of egg was used.

From the foregoing description it is apparent that this process produces a powdered product useful in the culinary arts, one which can be kept for an indefinite period without spoiling, and one which is very convenient to handle. By virtue of this invention it is possible to reduce the eggs to this economical form in country districts, and at times when eggs are plentiful and to ship the product long distances to the market. The great care necessary in packing eggs need not be used in packing this product, and here again further economy is achieved. I am aware of the fact that the whites of eggs and sugar are daily used both together and separately in cooking, but I am not aware that the ingredients have ever been reduced to this form in the manner set forth, or in the proportions indicated.

Having described my invention what I claim is:—

1. The hereindescribed process of preparing a food compound consisting in separating the whites and yolks of eggs, adding sugar to said whites and thoroughly whipping said whites and said sugar from time to time until they become dry.

2. The hereindescribed process of preparing a food compound consisting in separating the whites and yolks of eggs, adding sugar to said whites and thoroughly whipping said whites and said sugar from time to time until they become dry and reducing the dry mass to powdered form.

In testimony whereof I affix my signature in presence of two witnesses.

FRANK PREVOST.

Witnesses:
RUTH M. WEBB,
MABEL S. McQUEEN.

It is hereby certified that in Letters Patent No. 1,076,227, granted October 21, 1913, upon the application of Frank Prevost, of Oakland, California, for an improvement in "Processes of Making a Food Product", an error appears in the printed specification requiring correction as follows: Line 42, for the word "twelve" read *fifteen;* and that the said Letters Patent should be read with this correction therein that the same may conform to the record of the case in the Patent Office.

Signed and sealed this 13th day of January, A. D., 1914.

[SEAL.] J. T. NEWTON,

*Acting Commissioner of Patents.*